US006570115B1

(12) United States Patent
Rosenbaum

(10) Patent No.: US 6,570,115 B1
(45) Date of Patent: May 27, 2003

(54) METHOD FOR SORTING MAIL

(75) Inventor: Walter Rosenbaum, Paris (FR)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/979,083

(22) PCT Filed: Apr. 3, 2000

(86) PCT No.: PCT/DE00/00995

§ 371 (c)(1),
(2), (4) Date: Nov. 16, 2001

(87) PCT Pub. No.: WO00/69574

PCT Pub. Date: Nov. 23, 2000

(30) Foreign Application Priority Data

May 18, 1999 (DE) ........................................ 199 22 788

(51) Int. Cl.[7] ................................................ G06K 9/18

(52) U.S. Cl. ...................... 209/584; 209/630; 209/583; 209/577; 209/629; 209/900

(58) Field of Search ................................ 209/630, 629, 209/584, 900, 563, 564

(56) References Cited

U.S. PATENT DOCUMENTS 4,358,017 A 11/1982 Erikson
5,287,271 A 2/1994 Rosenbaum

FOREIGN PATENT DOCUMENTS

| | | |
|---|---|---|
| DE | 195 31 392 | 1/1997 |
| DE | 690 16 572 | 6/1998 |

*Primary Examiner*—Donald P. Walsh
*Assistant Examiner*—Jonathan R Miller
(74) *Attorney, Agent, or Firm*—Young & Thompson

(57) ABSTRACT

In the method, each envelope (1) is provided with an envelope number that can be read by humans and by machine. The control system of a sorting machine (4) is coupled to an e-mail system. The sender (3) looks for the addressee in the e-mail system and enters the number (2) of the envelope (1) to be sent. He then transmits a message with the addressee and the envelope number (2) to the control system of the sorting machine. In the control system there is a file (6) for the sorting plan, which allocates sorting compartments to the addressees. By means of the message from the e-mail system, the sorting compartment of the addressee is also allocated the envelope number (2), so that after the machine-readable number (2) of the envelope (1) has been read, the envelope can be led into the compartment belonging to the addressee. This allocation is then deleted again. In this way, the difficulties in reading the handwritten addresses are avoided.

4 Claims, 1 Drawing Sheet

METHOD FOR SORTING MAIL

FIELD OF THE INVENTION

The invention relates to a method according to the preamble of the main claim and can be used particularly advantageously in mail distribution within companies ("in-house distribution"). Distribution is carried out in accordance with the recipient addresses which are located on the items of mail. In order to detect these addresses, systems for reading addresses automatically (OCR) in the area of letter processing are known and described, for example, in DE 195 31 392. However, the reliability of detection varies sharply with the type of script and overall quality of the address information applied to the surface of the letters. In particular in the case of dispatch within companies and devices in special reusable envelopes, reading the addresses automatically is difficult, since the addresses are applied in handwritten form at various locations, and the senders do not always comply with agreed conventions. In the event of successful detection, the relevant item of mail can be sorted in accordance with any desired sorting order.

BACKGROUND OF THE INVENTION

Since the detection rates of the automatic reading systems vary very greatly, in particular taking into account the difficulties outlined, it is necessary to assist said systems by various forms of manual intervention. The simplest intervention is rejecting letters which cannot be read automatically and carrying out a manual sorting method. However, the costs which arise as a result are uneconomically high with increasing working costs.

In order to avoid these disadvantages of manual sorting of mail rejected by OCR, various methods for manual coding of items of mail have been developed. All these methods use interventions by operators in order to apply barcodes to the items of mail in a manner which is consistent with the requirement to perform mechanical sorting by means of the same machines which process OCR-read and barcoded post, for example by means of online video coding systems (OVS). In an OVS, a video image of the item of mail is led in front of an operator to be coded, instead of the physical item of mail in the case of manual coding stations. The video image is shown to the operator, while the physical item of mail is held in delay sections. In these delay sections, the item of mail is normally kept in motion for a time period which is sufficient for the OVS operator to enter the necessary sorting information for the relevant image. The conventional delay sections permit a delay of between 10 and 30 seconds. The longer the delay section, the higher are the costs and the requirements for maintenance and the physical size of the plant.

These measures for manual coding, such as special video coding stations, mail running sections as delay sections in the sorting machines, are complex with regard to the required space, the outlay on apparatus and, in particular for sorting processes with a relatively small scope, for example for in-house distribution, are uneconomic.

OBJECT OF THE INVENTION

The invention specified in claim 1 is therefore based on the object of providing a method for sorting mail which eliminates the necessity for the automatic reading of the written addresses and therefore also for the manual sorting or coding at special video coder stations, including the delay sections in the case of addresses which cannot automatically be read unambiguously.

SUMMARY OF THE INVENTION

The invention is based on the idea of using the existing workstation connections by means of e-mail systems, with the effect of avoiding the previously required automatic reading of the addressees (name and address information) which are often applied by hand, by coupling the e-mail system to the control system of the sorting machine. For this purpose, each envelope is provided with a code which can be read by humans and by machine, an envelope number, that is to say the numbering is found in numerical form and coded form, for example as a barcode on the envelope. The sender who wishes to send an item of mail or a number of items to an addressee therefore first looks for the addressee in the e-mail address file on his PC and, after he has found him, he adds the envelope number/s. When this envelope number/s is input, addressee and envelope numbers are transmitted to the sorting machine, in whose control unit a sorting plan is stored which allocates the addressee to a specific distribution point. Temporarily, the transmitted envelope number is also allocated to the distribution point by the transmission, so that when the machine-readable envelope number in the form of a barcode is read by a barcode reader belonging to the sorting machine, this item of mail can be sorted beyond all doubt to the relevant distribution point. After sorting has been carried out, but at the latest after renewed use of this envelope for dispatch and entry into the e-mail system, the allocation of the envelope to the addressee is cancelled. Using this method, fault-free sorting is possible even in the case of handwritten labeling of the envelope which is difficult to read.

Further refinements of the invention are presented in the subclaims.

In order to avoid the items of mail being "stood up" before being sorted (alignment in accordance with the address side) the envelope numbers are advantageously applied to both sides of the envelope.

It is also advantageous, with the entry of the envelope number and the addressee, to send an e-mail to the addressee for information that an item of mail is underway. This message can also be specifically delayed.

In a further advantageous refinement, the sender receives An e-mail for information that the item of mail has been removed from the sorting machine.

BRIEF DESCRIPTION OF THE DRAWINGS

In the following text, the invention will be explained in more detail using an exemplary embodiment and a drawing.

Here.

DETAILED DESCRIPTION OF THE INVENTION

Figure 1:
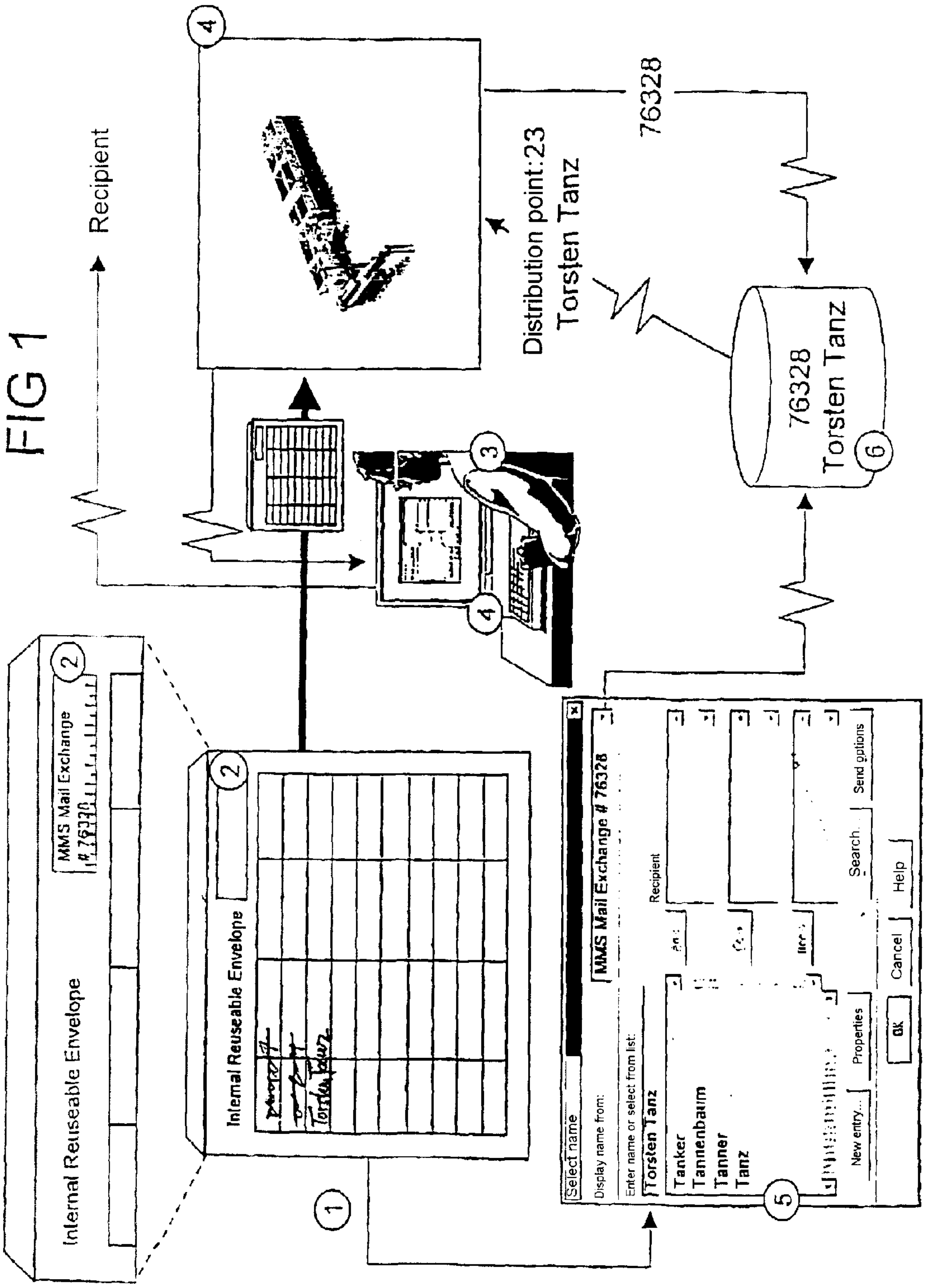
FIG. 1 shows the sequence of the method in schematic form in the case of mail distribution in a company.

For the sorting process, use is made of a sorting machine which is able to process a wide range of items of mail, incoming post, outgoing post and in-house post (post which has to be distributed within the company) having to be sorted. For this purpose, the addressees located in the address field on the items of mail have to be read. Using appropriate OCR readers, in known operating steps such as finding the address area, segmentation, character and word recognition, address interpretation, this object is achieved. Particular difficulties occur here when reading the addresses on reusable envelopes 1 for dispatch within the company. For the purpose of addressing, there are appropriate fields on the envelopes 1. If the envelope is reused, then the previous recipient is struck through and the next recipient/addressee is entered into the next free field.

Since, therefore, the addresses can be distributed over the entire envelope; many addresses will be found on the envelope at the same time, the invalid addresses having been made invalid only by a line, the addresses having been written by hand and address conventions not always having been complied with; there are particular difficulties when reading these envelopes, so that relatively high reject rates are to be recorded.

In order to avoid these difficulties, the envelopes 1 are provided with an identifying number 2 which can be read by humans and by machines. This numbering is carried out on both sides, so that it is not necessary to align the envelopes 1 in accordance with the address side before they are sorted. After the envelope or the envelopes 1 have been filled, on the PC 4 of the sender 3, the e-mail system,is open and, in the window 5 for the address book, the addressee, Torsten Tanz in this case, is looked for or entered. For this purpose, the corresponding envelope number 2 is entered and transmitted to the control system of the sorting machine 4 with an OK. In addition, the addressee receives an e-mail that an item of mail is underway from the sender X. This message can also be dispatched with a selectable delay.

This is possible since the known e-mail systems such as MS Outlook or Lotus Notes have open interfaces, so that connections to control systems of sorting machines 4 can be produced. In the control system of the sorting machine 4, its sorting plan is stored in a file 6 and specifies an allocation of the addressees to the distribution points. As a result of the transfer of the addressee and the envelope number 2 from the e-mail system, the envelope number 2 is added to the name in the file 6. Once the envelope 1 has reached the sorting machine 4 in the course of the distribution process and has been input into said machine, the first operation carried out is the reading of the distribution information, in this case the barcode as machine-readable envelope number 2. This can be read without difficulties by the reading device of the sorting machine 4. The identified envelope number 2 is then transmitted to the control system where, with the aid of the file 6 for the sorting plan, it is determined which name and therefore which distribution point is provided for this envelope 1 (distribution point 23), and by means of appropriate setting of diverters, the envelope is transported in one or more sorting runs into a sorting compartment allocated to this distribution point. After the sorting machine 4 has been emptied, the envelope number 2 is deleted again, both in the control system of the sorting machine 4 and in the address file of the e-mail system, so that the envelope 1 is available again for reuse. Furthermore, the sender optionally receives an e-mail message that his item of mail has left the sorting machine 4.

List of Reference Numbers

1 Envelope
2 Envelope number
3 Sender
4 Sorting machine
5 Address book window
6 File

What is claimed is:

1. A method for sorting mail using a sorting machine, which sorts the mail in accordance with a machine-readable code located on envelopes holding items of mail, which comprises the following steps providing each envelope (1) with its own envelope number (2) in the form of a number that can be read by humans and a machine-readable code for identification, providing the envelope or envelopes (1) to be dispatched with the information about an addressee which can be read by humans, looking for the addressee in an e-mail address file of an e-mail system, inputting the number/s (2) of the envelope or envelopes (1) to be dispatched relating to the addressee into the e-mail system by a sender of the envelope, transmitting the addressee, together with the associated envelope numbers (2) from the e-mail system, to the sorting machine which is coupled to the e-mail system and in whose sorting plan the addressee from the e-mail address file is allocated a distribution point, and temporary allocation of the envelope numbers (2) to the distribution point of the addressee, transporting the mail to the sorting machine (4), automatically reading the machine-readable envelope numbers (2) and sorting in accordance with the envelope numbers (2) assigned to the addressee and therefore to the distribution point by means of the e-mail input, deleting the existing allocation of the envelope numbers (2) to the addressee and distribution point, at the latest when these envelopes (1) are reallocated.

2. The method as claimed in claim 1, characterized in that the envelopes (1) are provided on both sides with the envelope number (2).

3. The method as claimed in claim 1, characterized in that, with the command to transmit the data to a control unit of the sorting machine (4), the transmission of an e-mail to the addressee about the dispatch is also initiated with a selectable delay.

4. The method as claimed in claim 1, characterized in that after the sorting machine (4) has been emptied, the sender (3) receives an e-mail about this operation.

* * * * *